US012783342B2

(12) United States Patent
Ramnani et al.

(10) Patent No.: US 12,783,342 B2
(45) Date of Patent: Nov. 3, 2026

(54) METHOD AND SYSTEM FOR INCIDENT ANALYSIS

(71) Applicant: ACCENTURE GLOBAL SOLUTIONS LIMITED, Dublin (IE)

(72) Inventors: Roshni Ramesh Ramnani, Bangalore (IN); Anutosh Maitra, Bangalore (IN); Raksha Pavagada Subbanarasimha, Bangalore (IN); Milind Savagaonkar, Bangalore (IN); Ankur Gakhar, Hisar (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 48 days.

(21) Appl. No.: 18/986,058

(22) Filed: Dec. 18, 2024

(65) Prior Publication Data

US 2026/0169850 A1 Jun. 18, 2026

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC ............... G06F 11/0769; G06F 11/079; G06F 11/2252; G06F 11/2257; G06F 11/2263
See application file for complete search history.

(56) References Cited

U.S. PATENT DOCUMENTS

| | | | | |
|---|---|---|---|---|
| 2025/0111150 | A1* | 4/2025 | Garapati | G06F 40/20 |
| 2025/0130884 | A1* | 4/2025 | Wong | G06N 3/0455 |
| 2025/0247283 | A1* | 7/2025 | Zhang | H04L 41/0631 |
| 2025/0265468 | A1* | 8/2025 | Ranga Prasad | G06N 5/04 |
| 2025/0291670 | A1* | 9/2025 | Page | G06F 11/0793 |
| 2026/0050507 | A1* | 2/2026 | Shavit | G06F 11/079 |

OTHER PUBLICATIONS

Ghanta, Sriram, From Observability to Understanding: Automated Incident Triage Using Large Language Model Reasoning Over Logs, Metrics, and Traces, 2023, IJEETR (Year: 2023).*

(Continued)

*Primary Examiner* — Marc Duncan
(74) *Attorney, Agent, or Firm* — Mannava & Kang, P.C.

(57) ABSTRACT

The present disclosure discloses methods and systems for incident analysis. The method includes identifying incident information relevant to the incidents on a computer network. Herein, the incident information is gathered over a predetermined run-time period prior to occurrence of the incidents. Further, a context for the incidents based on the incident information, including generating a chain of event classification for the incidents based on a reasoning-based analysis of an event correlation, is determined. Moreover, an incident summary for the incidents is determined, followed by, determining a root cause for the incidents. Thereafter, a resolution on the computer network based on the root cause, is implemented. Specifically, the resolution information, associated with the root cause, is gathered and a resolution communication having the incident summary, the root cause, and an explanation associated with the root cause, is generated.

18 Claims, 6 Drawing Sheets

(56) References Cited

OTHER PUBLICATIONS

Asano Masafumi, PTP Lidding Material and PTP Package, European Patent Application "21897543.1" dated Oct. 18, 2021.
Joel Mckelvey, How automated root-cause analysis can help reduce MTTR, BigPanda, Sep. 26, 2023.
Yinfang Chen, Huaibing Xie, Minghua Ma, Yu Kang, Xin Gao, Liu Shi, Yunjie Cao, Xuedong Gao, Hao Fan, Ming Wen, Jun Zeng, Supriyo Ghosh, Xuchao Zhang, Chaoyun Zhang, Qingwei Lin, Saravan Rajmohan, Dongmei Zhang, Tianyin Xu, Automatic Root Cause Analysis via Large Language Models for Cloud Incidents, Arxiv, "https://arxiv.org/abs/2305.15778" Downloaded from the internet on Dec. 16, 2024.

* cited by examiner

METHOD AND SYSTEM FOR INCIDENT ANALYSIS

TECHNICAL FIELD

Various embodiments described herein relate generally to incident analysis. Specifically, a method and a system for incident analysis using generative artificial intelligence (Gen AI).

BACKGROUND

Computer systems and networks form the backbone of countless applications and services. As their use expands, ensuring their reliability, availability, and security becomes paramount. However, the intricate nature of these systems makes them susceptible to a range of incidents that can compromise these vital aspects.

Managing incidents in large and complex computer systems and networks is a multifaceted process with a significant impact on service health and developer productivity. On-call engineers require substantial domain knowledge and manual effort to mitigate production incidents. By pinpointing the root cause or causes of an incident or critical failure, response teams can expedite incident resolution and implement effective preventive measures. This leads to a reduction in both the frequency and duration of service interruptions, by proactively preventing recurring incidents.

Recent breakthroughs in advanced large language models (LLM) offer enhanced, more accurate interpretations of incident descriptions, facilitating the identification of relationships between different elements within structured and unstructured data.

SUMMARY

Implementations of the present disclosure are generally directed to incident analysis using generative artificial intelligence (Gen AI), machine learning (ML) and deep learning (DL) techniques. More particularly, implementations of the present disclosure are directed to methods and systems for incident analysis by identifying root cause of an incident and implementing preventive measures and mitigating production incidents by eliminating the root cause rather than the symptoms.

In general, innovative aspects of the subject matter described in herein provide a method and a system for incident analysis. The method may include identifying incident information relevant to one or more incidents on a computer network, wherein the incident information may be gathered over a predetermined run-time period prior to occurrence of the one or more incidents. Further, the method may include determining a context for the one or more incidents based on the incident information, including generating a chain of event classification for the one or more incidents based on a reasoning-based analysis of an event correlation. Moreover, the method may include determining an incident summary for the one or more incidents based on the context, followed by determining a root cause for the one or more incidents based on the incident summary and the context. Furthermore, the method may include implementing a resolution on the computer network based on the root cause. In further detail, implementing the resolution may include gathering resolution information associated with the root cause, including an operational reference document for the computer network. Additionally, implementing the resolution may further include generating a resolution communication having the incident summary, the root cause, and an explanation associated with the root cause.

The present disclosure further describes a system for implementing the method provided herein. The present disclosure also describes non-transitory computer-readable media (CRM) coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DRAWINGS

Various embodiments in accordance with the present disclosure will be described with reference to the drawings, in which.

DETAILED DESCRIPTION

Figure 1:
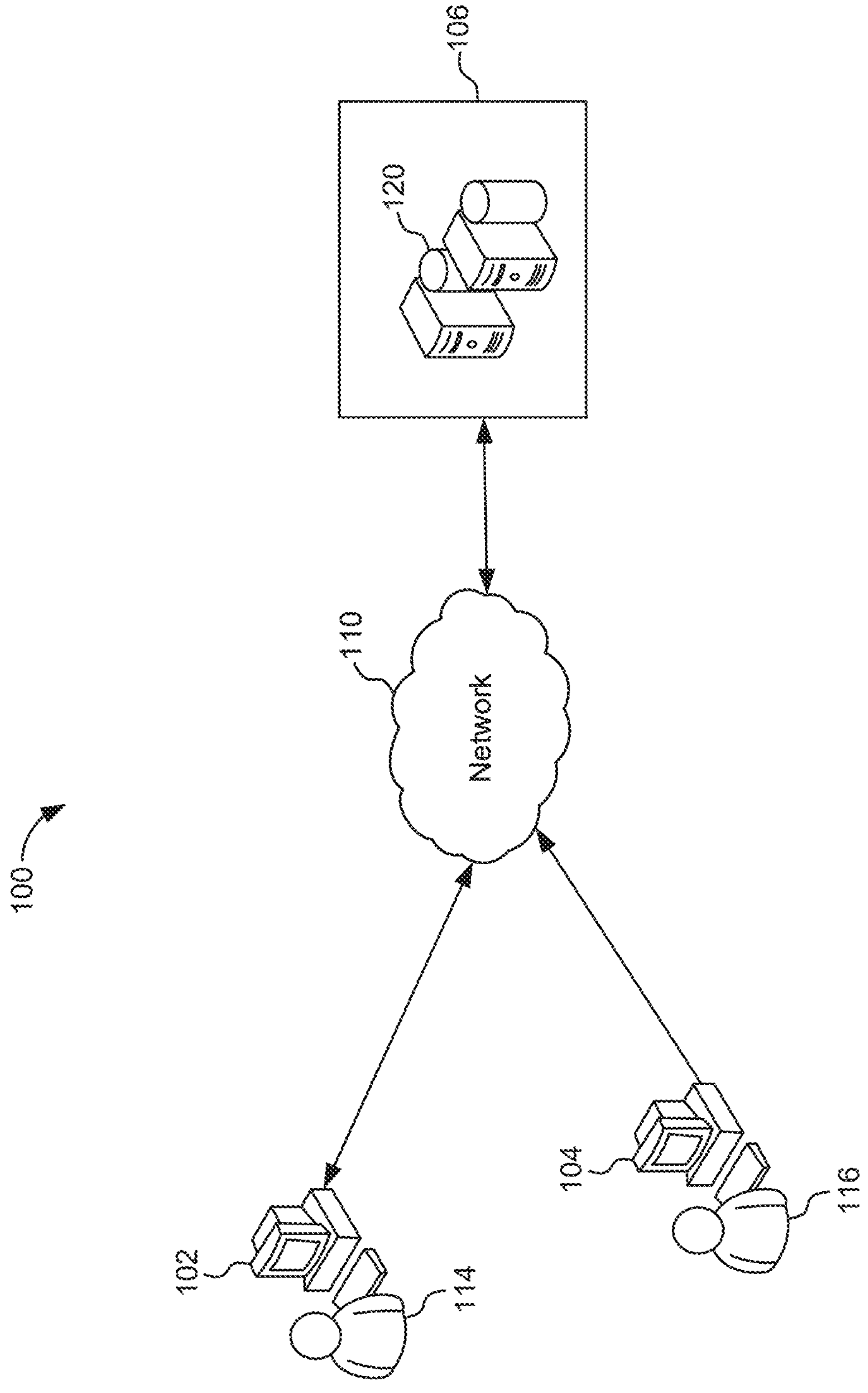
FIG. 1 illustrates an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term “comprising” when utilized means “including, but not necessarily limited to”; it specifically indicates open-ended inclusion or membership in the so-described combination, group, series and the like.

The term “a” means “one or more” unless the context clearly indicates a single element.

“First,” “second,” etc., are labels to distinguish components or blocks of otherwise similar names but does not imply any sequence or numerical limitation.

“And/or” for two possibilities means either or both of the stated possibilities (“A and/or B” covers A alone, B alone, or both A and B take together), and when present with three or more stated possibilities means any individual possibility alone, all possibilities taken together, or some combination of possibilities that is less than all of the possibilities. The language in the format “at least one of A. and N” where A through N are possibilities means “and/or” for the stated possibilities (e.g., at least one A, at least one N, at least one A and at least one N, etc.).

“Prompt” or the like refers to a submission to an AI model for processing.

“Incident” refers to any unexpected or unplanned event that disrupts the normal operation of the system or its components.

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

The conventional methodologies for incident analysis have technical limitations. Conventional incident analysis methods rely on a prompt-based approach, where a query is submitted to a large language model (LLM). The LLM then searches for similar past incidents and proposes solutions based on historical data. Herein the LLM generates a response based on the general knowledge and the information available in the training data. However, the conventional methods may not always provide highly specific or tailored solutions, as the LLM may not have access to the specific context of the incident or the computer network’s unique architecture. Moreover, even if the LLM is provided with more specific information, such as the system logs, configuration details, and past incident reports, the method still relies on the availability of historical data and is not effective for novel or unprecedented incidents.

Further, the conventional incident analysis methods utilize rule-based approaches, similarity matching, and human intervention for incident classification and resolution. Thus, the conventional incident analysis methods are unable to identify the broader context of an incident, leading to inaccurate classifications and resolutions. Additionally, human intervention in categorization and interpretation can introduce bias and inconsistency.

In view of this, a method and system for incident analysis using generative artificial intelligence (Gen AI), machine learning (ML) and deep learning (DL) techniques, to overcome above mentioned drawbacks of conventional incident analysis are described herein. The present disclosure implements decision making and environment interaction abilities of LLMs. Furthermore, the present disclosure utilizes capabilities of commonsense knowledge graph and domain knowledge graph for context-based reasoning to determine the context, and thus the root cause of the incident. Furthermore, the present disclosure implements automatic analysis of system logs and identification of potential root causes, reducing the need for manual intervention. Moreover, the present disclosure implements predicting potential incidents based on historical data and system logs. Thus, the system can proactively take steps to prevent the incidents from future occurrence.

FIG. 1 depicts an example environment 100 that can be used to execute implementations of the present disclosure. In some examples, the example environment 100 enables users associated with respective systems to execute requests to generate content by invoking a trained language model in accordance with implementations of the present disclosure. The example environment 100 includes computing devices 102 and 104, back-end systems 106, and a network 110. In some examples, the computing devices 102 and 104 are used by respective users 114 and 116 to log into and interact with the platforms and running applications according to implementations of the present disclosure.

In the depicted example, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems 106. In some examples, the network 110 can be accessed over a wired and/or a wireless communications link. For example, mobile computing devices, such as smartphones can utilize a cellular network to access the network 110.

In the depicted example, the back-end systems 106 each include at least one server system 120. In some examples, the at least one server system 120 hosts one or more computer implemented services that users can interact with by using computing devices. For example, components of enterprise systems and applications can be hosted on one or more of the back-end systems 106. In some examples, the back-end system 106 can be provided as an on-premises system that is operated by an enterprise or a third-party taking part in cross-platform interactions and data management. In some examples, the back-end system 106 can be provided as an off-premises system (e.g., cloud or on-demand) that is operated by an enterprise or a third-party on behalf of an enterprise.

In some examples, the computing devices 102 and 104 each include computerexecutable applications executed thereon. In some examples, the computing devices 102 and 104 each include a web browser application executed thereon, which can be used to display one or more web pages of platform running applications. In some examples, each of the computing devices 102 and 104 can display one or more GUIs that enable the respective users 114 and 116 to interact with the computing platform. In accordance with implementations of the present disclosure, the back-end systems 106 may host enterprise applications or systems that require data sharing and data privacy. In some examples, the computing device 102 and/or the computing device 104 can communicate with the back-end systems 106 over the network 110.

In some implementations, at least one of the back-end systems 106 can be implemented in a cloud environment. The back-end systems 106 includes at least one server system (or server) 120. In the example of FIG. 1, the back-end system 106 can include various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 can be used to implement an Artificial Intelligence (AI)-enabled platform trained to generate content relevant for individuals in accordance with contextual information and training data indicative of reactions of similar consenting individuals to certain content items (e.g., neuroscience responses). The AI-enabled platform can include a trained generative AI model that generates such personalized content.

Various examples depicting incident analysis, are described in detail in conjunctions with figures below.

Figure 2:
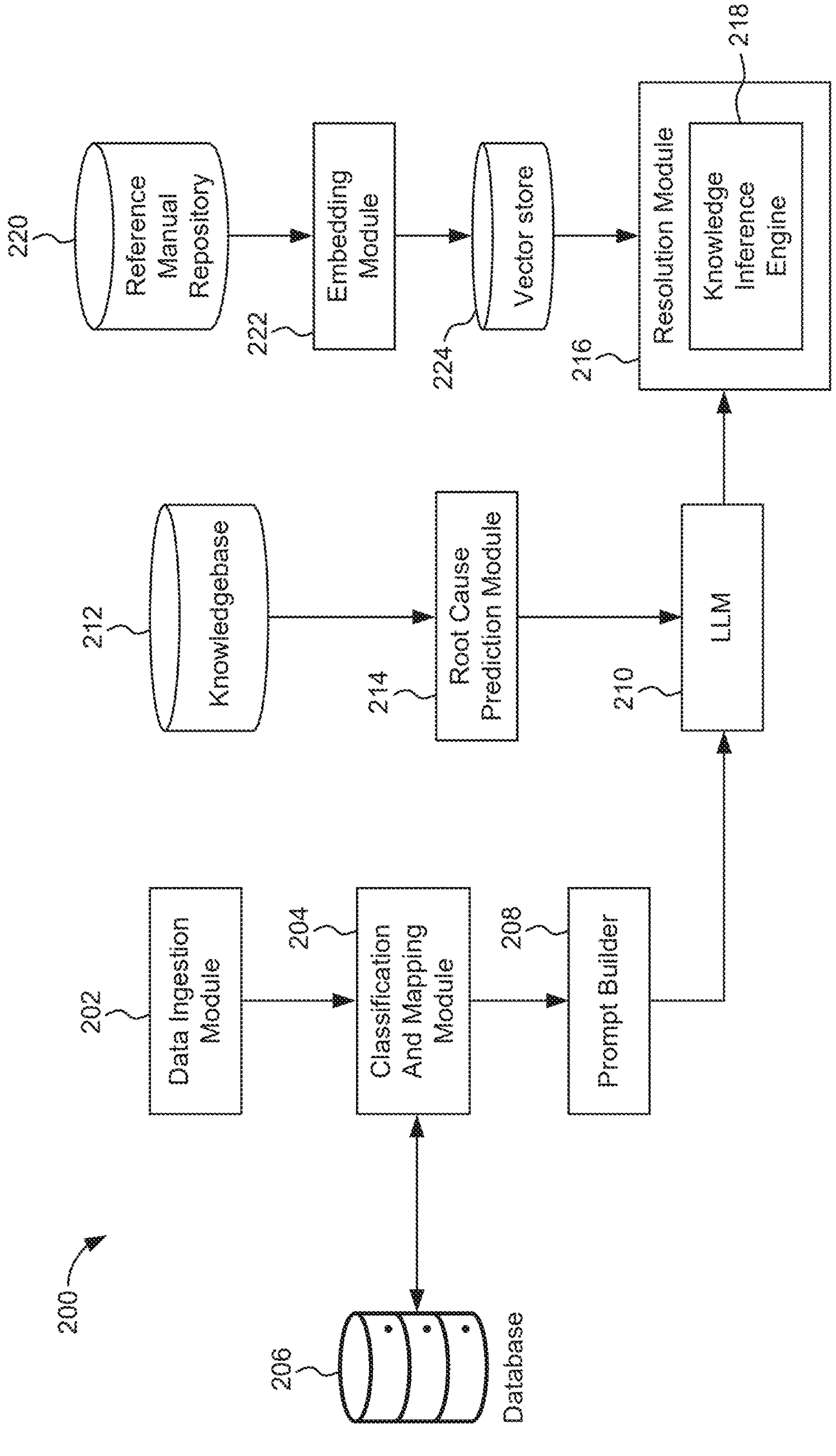
FIG. 2 illustrates an example block diagram representation of a high-level architecture of system implementing incident analysis, in accordance with implementations of the present disclosure.

FIG. 2 illustrates a block diagram representation of a high-level architecture of system 200 implementing incident analysis, in accordance with implementations of the present disclosure. The system 200 may include a data ingestion module 202, a classification and mapping module 204, a database 206, a prompt builder 208, a large language model (LLM) 210, a reference manual repository 220, an embedding module 222, a vector store 224, a resolution module 216 and a knowledge inference engine 218.

The data ingestion module 202 may obtain incident information. The incident information may be gathered over a predetermined run-time period prior to occurrence of the one or more incidents. The incident information may refer to the data collected and processed to determine the context, cause, and potential impact of a specific issue or incident within a computer system or network. Specifically, the incident information may include, but not limited to, information related to network architecture, network elements, network modules and network system logs. The network architecture may include data related to the configuration and topology of the computer network infrastructure, including devices, connections, and protocols. The network element may include information about specific components of the network, such as routers, switches, firewalls, and server. The network modules may include data pertaining to software modules or subsystems within the network infrastructure. The network system logs may include records generated by various network devices and applications, capturing events, errors, and performance metrics. Moreover, the data ingestion module 202 may obtain incident information related to one or more events from various data sources, including multimodal and multi-context entries, domain expert insights, and an external commonsense knowledge graphs (CSKG). The CSKG may provide general knowledge that may be used to infer context and potential solutions for incidents Furthermore, the data ingestion module 202 may receive one or more incident raised/input by an application user with a brief description of the incident faced. Herein the incident may include, but not limited to, hardware failures (for example, issues with physical components such as servers, storage devices, or network equipment), software errors (for example bugs, glitches, or crashes in software applications or operating systems), security breaches (for example unauthorized access, data breaches, or cyberattacks), network outages and human error (for example, malfunctions made by users or administrators that lead to system failures).

Thereafter, the classification and mapping module 204 may identify incident information relevant to one or more incidents (input by the user) on a computer network. Identifying incident information may include identifying one or more system logs relevant to the said incidents. The said system logs may be stored in the database 206. Specifically, the classification and mapping module 204 may extract and analyze the system logs (stored in the database 206 relevant to the one or more incidents (raised by the user). Thus, over time, specific causal factors associated with the incidents and the corresponding health indicators of the system at those points may be identified. The analysis of system logs stored in the database 206 may predict the likelihood of certain incidents based on current log patterns of the system logs. For example, if the system exhibits log patterns similar to those observed in past incidents, a potential risk of a similar occurrence may be recommended. Thus, analyzing the system logs may facilitate proactive incident prevention and mitigation. Moreover, identifying incident information may include mapping one or more relationships between the one or more network elements and network modules. Non-limiting examples of network elements may include routers, switches, firewalls, servers, and other network hardware. Further, non-limiting examples of network modules may include software modules or subsystems that control and manage the network elements (for example routing protocols, firewall policies, server operating systems, and application software etc.). The classification and mapping module 204 may analyze the network configuration files and management interfaces in the system logs to determine the interconnections and configurations of the network elements and the network module. Thus, when an incident occurs, the mapping may determine the potential scope and severity of the disruption based on the interconnectedness of the affected elements and modules.

In further detail, the classification and mapping module 204 may determine a context for the one or more incidents based on the incident information. Furthermore, determining the context may include generating a chain of event classification for the one or more incidents based on a reasoning-based analysis of an event correlation. Specifically, the classification and mapping module 204 may determine the context of the input incident by utilizing a commonsense knowledge graph. The commonsense knowledge graph may be a structured representation of common-sense knowledge about the input incident, and may include entities, relationships, and their attributes. By leveraging commonsense knowledge graph, the classification and mapping module 204 may gain a deeper understanding of the incident and its implications. Moreover, through the determined context, a probabilistic matching is performed to identify the category of the incident. The detailed function of the the classification and mapping module 204 is described in further paragraphs in conjunction with FIG. 3. Thereafter, based on the identified category, respective system logs of the components that are impacted by the identified category may be retrieved from the database 206.

Moreover, the prompt builder 208 may be provided to dynamically constructs prompts for the LLM 210 based on the identified system logs. The prompt builder 208 may analyse the identified system logs and based on the analysis, the prompt builder 208 may generate dynamic prompts that may instruct the LLM 210 to determine an incident summary for the one or more incidents based on the context identified by the classification and mapping module 204. Specifically, by analyzing system logs, the prompt builder 208 may identify key indicators and patterns relevant to the incident. The prompt builder 208 may construct dynamic prompts that guides the LLM 210 to perform reasoning process. Further, the prompt builder 208 may incorporates additional contextual information to instruct the LLM 210 to perform reasoning. The said contextual information may include, but not limited to incident frequency, user impact, and specific log anomalies. By considering said contextual information, the prompt builder 208 may differentiate between similar incidents with different root causes and identify novel incidents that may not have direct historical precedents. Additionally, the prompt builder 208 may iteratively refine the prompts based on the LLM's 210 initial responses. This allows the prompt builder 208 to adapt to the specific characteristics of each incident and to improve the accuracy of the root cause analysis.

The system 200 may further include the large language model (LLM) 210. Specifically, the LLM 210 may determine an incident summary for the one or more incidents based on the context identified by the classification and mapping module 204. Herein, the incident summary may refer to a concise and informative overview of an incident, capturing its essential details and providing a preliminary information of the incident's nature, scope, and potential impact.

Thereafter, the root cause prediction module 214 may be provided to determine a root cause for the one or more incidents based on the incident summary and the context. The root cause may refer to the underlying reason or fundamental issue that led to the incident. Moreover, determining the root cause may include determining one or more affected network elements based on the context of the incident. Determining the root cause may further include extracting targeted network information associated with the one or more affected network elements from the knowledgebase 212. The targeted network information may be associated with the one or more potential root causes. Specifically, the knowledgebase 212 may serve as a repository of information that stores the targeted network information. The targeted network information may include past event information and network structural information for the one or more affected network elements. Additionally, the targeted network information may include recent similar incidents and events involving a user associated with the one or more incidents. For example, the past event information may include but not limited to error logs (records of errors, exceptions, or abnormal behavior that have occurred in the past), performance metrics (data on the performance of network elements, such as utilization, latency, or throughput), security events (information about security breaches, unauthorized access attempts, or other security-related incidents) and maintenance records (documentation of maintenance activities, upgrades, or configuration changes). Further, the network structural information may include but not limited to, configuration and layout of the network, relationships between network elements and settings and parameters of network devices, (for example, protocols, interfaces, and security policies). The recent similar incidents may include incidents involving the same user or group of users, incidents with similar characteristics or symptoms and incidents that occurred within a recent timeframe. In essence, identifying the root cause by the root cause prediction module 214 may lead to the implementation of preventive measures to avoid future incidents.

The root cause and prediction module 214 may compare the incident summary determined by the LLM 210 with the targeted network information stored in the knowledgebase 212. The root cause and prediction module 214 may utilize similarity metrics (e.g., cosine similarity, Jaccard similarity) for the said comparison. Based on the comparison, the root cause and prediction module 214 may retrieve one or more of the most relevant past incidents, most relevant past incidents raised by same user or highly repeated incidents in the recent timeframe. The root cause and prediction module 214 may utilize retrieval augmented generation (RAG) technique to retrieve and analyze the most relevant incidents. Furthermore, the root cause and prediction module 214 may utilize the chain of thought prompting for analyzing and determining the root cause of the incident. The chain of thought prompt may refer to a technique used in prompting the LLM 210 to generate step-by-step reasoning. For instance, the chain of thought prompt may include steps of: clearly defining the incident and its symptoms; suggesting potential root causes based on the symptoms and past incidents; identifying relevant data points to support or refute the hypotheses; drawing conclusions based on the evidence and applying logical reasoning; and selecting the most likely root cause from the analyzed hypotheses. In essence, by using the chain of thought prompt, the root cause and prediction module 214 may cause the LLM 210 to generate the root cause of the incident and an explanation of the same. Herein, the one or more incidents may be similar to a previous incident occurring on the computer network, and the root cause for the one or more incidents may be different than a root cause for the previous incident.

Moreover, the one or more incidents may not be similar to a previous incident on the computer network and lacks relevant historical data. In such case, the prompt builder 208 may generate prompt to generate the incident summary based on the system logs. The prompt is then may be fed to the LLM 210. The LLM 210 may process the prompt and generate a potential root cause for the incident, along with a detailed explanation that supports the conclusion. This approach leverages the LLM's 210 ability to process and understand natural language, allowing it to identify patterns and correlations within the log data, even in the absence of historical precedents. In further detail, the prompt builder 208 may break down the incident into smaller, more manageable subproblems. For instance, the prompt builder 208 may instruct LLM 210 to first identify the affected components, then analyze system logs for anomalies, and finally determine the root cause. Moreover, the prompt builder 208 may instruct the LLM 210 to consider multiple factors, such as user impact, system performance, and security implications. The prompt builder 208 may guide the LLM 210 to generate a range of potential solutions and evaluate their feasibility based on factors like cost, risk, and impact. Additionally, the prompt builder 208 may provide relevant context, such as historical incident data, system configurations, and user feedback, enabling the LLM 210 make informed decisions. In essence, by effectively utilizing the prompt builder 208, the LLM 210 may provide more accurate and insightful analysis, leading to faster and more effective incident resolution.

After the root cause for the one or more incidents is determined by the LLM 210, the root cause may be sent to the resolution module 216 to implement a resolution for the input incident. The resolution module 216 may gather resolution information associated with the root cause. The information associated with the root cause may include an operational reference document for the computer network. The operational reference document may be stored in the reference manual repository 220. Further, the operational reference document may serve as a guide for the operation, maintenance, and troubleshooting of the network infrastructure. The operational reference document may include detailed information about network components, configurations like, but not limited to network diagrams, configuration documents, standard operating procedures (SOPs), change management procedures, security policies and incident response plans. Herein, network diagrams may refer to the visual representations of the network topology, including devices, connections, and protocols. The configuration documents may refer to the detailed records of device configurations, such as IP addresses, routing protocols, and security settings. The SOPs may refer to the step-by-step instructions for performing common network tasks, such as troubleshooting, maintenance, and incident response. The change management procedures may refer to the guidelines for implementing changes to the network, including change request processes and approval workflows. The security policies may refer to the policies and procedures for securing the network, including access control, encryption, and vulnerability management. The incident response plans may refer to the plans for responding to security incidents, such as data breaches or cyberattacks. In essence, by referencing the operational reference document, stored in the reference manual repository 220, network's normal behavior and performance characteristics may be identified and thus, the potential deviations or anomalies may be identified that may have contributed to the incident.

In further detail, the reference manual repository 220 may store the collection of operational reference document including technical documentation, system specifications, and operational procedures. The embedding module 222 may receive the operational reference document as input and generate vector embeddings of the resolution information contained within the operational reference document. Vector embeddings are numerical representations of data, that capture semantic meaning. Further, the vector store 224 may store the vector embeddings of the information extracted from the reference manual repository 220. Thereafter, the knowledge inference engine 218 in the resolution module 216, may generate a knowledge graph from the vector embeddings stored in the vector store 224. The knowledge graph may be a is a visual representation of the relationships between entities and attributes in the operational reference document. Specifically, the knowledge inference engine 218 may identify relevant information from the reference manuals based on root cause of the input incident. Moreover, the knowledge inference engine 218 may recommend the resolution based on a probabilistic evaluation of the vector embedding. The probabilistic evaluation may include assigning probabilities to different potential resolutions based on the similarity of their vector representations. Based on the probabilistic evaluation the resolution module 216 may generating a resolution communication having the incident summary, the root cause, and an explanation associated with the root cause. Specifically, the resolution communication may outline the key aspects of an incident, including its summary, root cause, and the reasoning behind the identified root cause. The resolution communication may be shared with relevant stakeholders, such as IT support teams, system administrators, or end-users via a user interface (not shown in FIG. 2).

Moreover, the resolution module 216 may detect and resolve anomalies in the computer network. The anomalies may refer to deviation of computer network functioning from standard functioning. The knowledge inference engine 218 may train an artificial intelligence (AI) model (not shown in the FIG. 2) to learn normal system behavior by feeding the data of operational reference document. At regular intervals, the reference manual repository 220 may collect newly generated system logs and the knowledge inference engine 218 may compare with the trained AI model to identify the anomaly. If the anomaly is identified, the resolution module 216 may initiate a preventive resolution. Herein, the preventive resolution may include proactive steps for preventive maintenance and remediation to address potential issues before they escalate into incidents. For instance, the preventive resolution may include, but not limited to, applying security patches to address known vulnerabilities that can be exploited, modifying system configurations to mitigate risks and improve security, adjusting system resources to accommodate increased demand or prevent performance degradation and sending notifications to relevant teams to inform them of the potential issue and request their attention.

Specifically, the resolution module 216 may analyze the system logs to identify the anomalies. The anomalies may include unexpected error messages, performance degradation, or security alerts etc.

Figure 3:
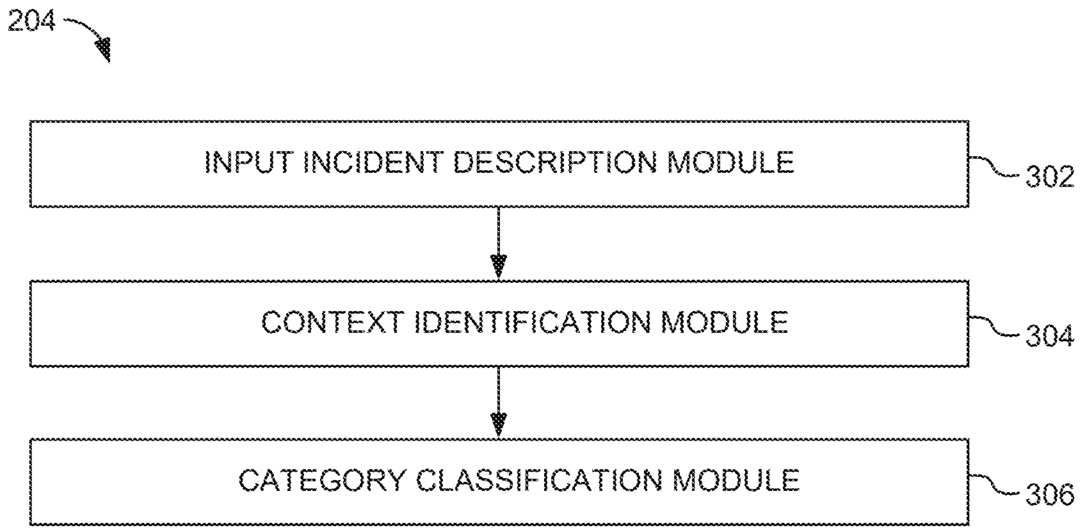
FIG. 3 illustrates an example block diagram representation of classification and mapping module, in accordance with implementations of the present disclosure.

FIG. 3 illustrates an example block diagram representation of classification and mapping module 204, in accordance with implementations of the present disclosure. The classification and mapping module 204 may further include an input module 302, a context identification module 304 and a category classification module 306.

The input module 302 may receive a textual description of the incident. Further, the context identification module 304 may establish the event correlation for the one or more incidents based on the incident information (received by the data ingestion module 202 in FIG. 2). Specifically, the context identification module 304 may analyze the description of the incident by using the deep learning (DL) technique. The DL technique may include analyzing the incident utilizing a commonsense knowledge graph and/or a domain-specific knowledge graph. The domain-specific knowledge graph may be created from historical data. The domain-specific knowledge graph may include the characteristics and relationships between different aspects of the past incidents. For example, the domain-specific knowledge graph may include information about different types of incidents, their symptoms, root causes, and resolution strategies. The commonsense knowledge graph may include information about related events, potential causes, and common resolution strategies. For example, if the incident involves a network outage, the commonsense knowledge graph may provide information about common causes of network outages, such as hardware failures, software bugs, or configuration errors.

In further detail, if the input incident is repeated in nature, the domain-specific knowledge graph may be queried by the context identification module 304 to identify the context of the incident, such as the domain, the type of problem, or the affected component. Moreover, if the incident is novel in nature, the commonsense knowledge graph may be queried by the context identification module 304 to the context of the incident. Thereafter, the category classification module 306 may classify the incident into the appropriate category. Specifically, the category classification module 306 may determine one or more category classifications based on a probabilistic evaluation of the chain of event classification. The probabilistic evaluation may include analyzing the relationships between nodes in the commonsense knowledge graph to determine the most likely category. Specifically, the probabilistic evaluation may include applying the probabilistic inference techniques to the commonsense knowledge graph and/or a domain-specific knowledge graph and the query to calculate the probabilities of various possible categories. The calculated probabilities may be used to make decisions or recommendations to identify probable category of the incident.

In an example, the input module 302 may receive the incident description “I am unable to access the application.”. The context identification module 304 may query the domain-specific knowledge graph, which contains historical incident data and search for similar incidents, such as “Network connectivity issues,” “WiFi problems,” or “DNS failures”. The context identification module 304 may further utilize the probabilistic graph reasoning to analyze the relationships between nodes in the domain-specific knowledge graph. Specifically, the probabilistic graph reasoning may include calculating the probability of the incident belonging to different categories, such as “hardware failure,” “software bug,” or “network configuration issue.” The category with the highest probability may be assigned to the incident by the category classification module 306. For instance, the category classification module 306 may classify the incident as a “network connectivity issue” and recommend potential solutions, such as checking network cables, restarting the computer, or contacting the IT support team.

Figure 4:
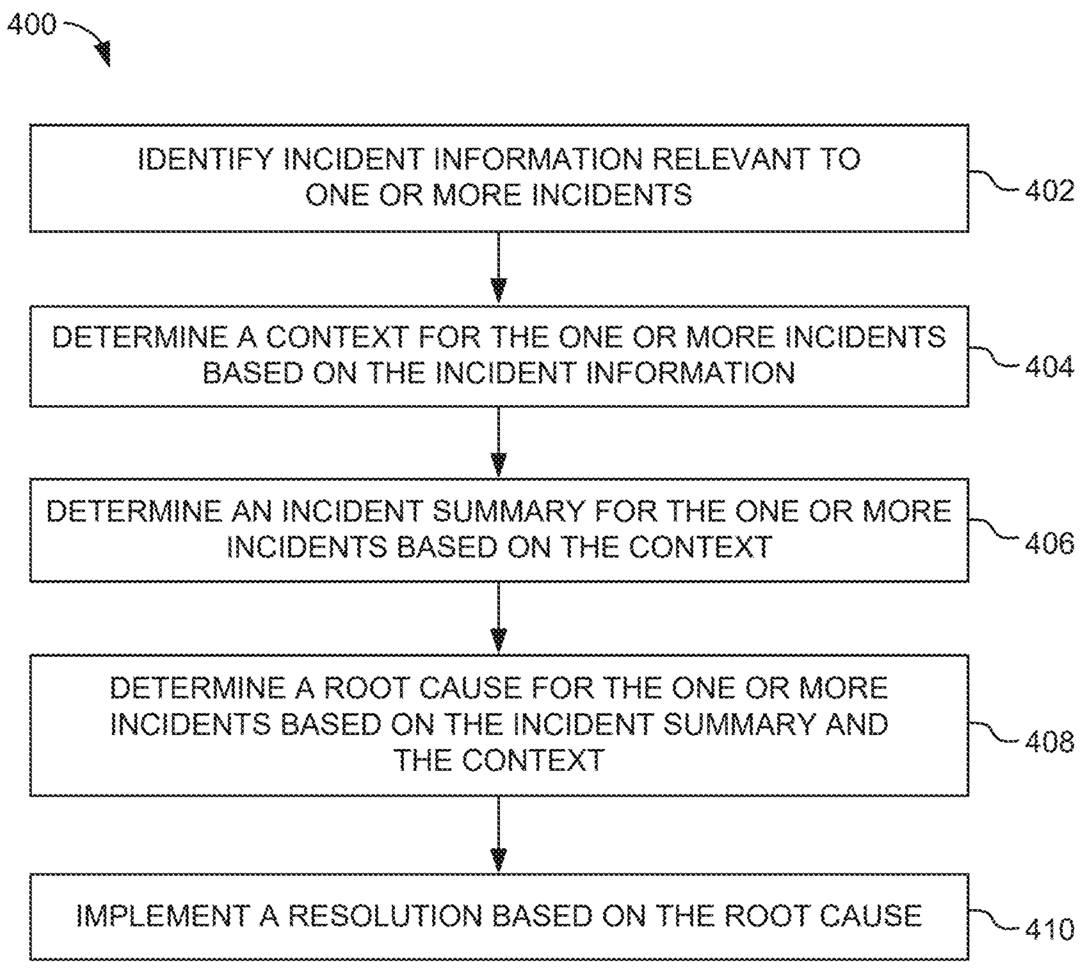
FIG. 4 illustrates a flow diagram of an example method to implement incident analysis, in accordance with implementations of the present disclosure.

FIG. 4 illustrates the flow diagram of an example method 400 to implement the incident analysis, in accordance with implementations of the present disclosure, as described in conjunction with FIG. 2, herein.

The method 400 may include identifying 402 the incident information relevant to one or more incidents. Specifically, the data ingestion module 202 may retrieve the relevant incident information from the database 206 based on the input incident raised by the user. The incident information may include, but not limited to, the information related to network architecture, information related to one or more network elements, information related to one or more network modules, and network system logs.

In an example, the input incident raised may be as below:

Datetime: 15-05-2024 11:02:00

Description: There is an urgent analysis report to be generated but the data is not loading. Kindly look into the issue.

User: Dataexpert

The data ingestion module 202 may retrieve the below incident information from the database 206. Herein, the incident information may include relevant system logs.

2024-05-15 10:45:00 [INFO] [SAP Business Objects]—User ‘DataExpert’ triggering data extraction for a new analytics report 2024-05-15 10:45:01 [DEBUG] [SAP Business Objects]—Initializing query execution for ‘DataExpert’.

2024-05-15 10:45:02 [ERROR] [SAP Business Objects]—Query execution failed for ‘DataExpert’. Error: Timeout_Exceeded.

2024-05-15 10:45:03 [INFO] [Notification Service]—Alerting ‘DataExpert’ about query timeout.

2024-05-15 10:45:04 [ERROR] [Notification Service]—Failed to deliver notification to ‘DataExpert’. Error: Server_Unreachable.

2024-05-15 10:45:05 [WARN] [Notification Service]—Retrying notification delivery for ‘DataExpert’.

2024-05-15 10:45:06 [ERROR] [Network Service]—Server unreachable, impacting notification delivery for ‘DataExpert’.

2024-05-15 10:45:07 [CRITICAL] [Network Service]—Network failure affecting various services, including query execution.

2024-05-15 10:45:08 [INFO] [Network Service]—Probing root cause of network failure.

2024-05-15 10:45:09 [ERROR] [SAP HANA Studio]—Noticing significant latency in query execution for ‘DataExpert’.

2024-05-15 10:45:10 [CRITICAL] [SAP HANA Studio]—Latency causing disruptions in critical data operations, including report retrieval.

2024-05-15 10:45:11 [INFO] [SAP HANA Studio]—Launching investigation into database performance issues.

The method 400 may include determining 404 the context for the one or more incidents based on the incident information. Specifically, the classification and mapping module 204 may determine the context.

The method 400 may include determining 406 the incident summary for the one or more incidents based on the context. Specifically, the LLM 210 may determine the incident summary.

The method 400 may include determining 408 the root cause for the one or more incidents based on the incident summary and the context.

For example, the LLM 210 may determine the below mentioned incident summary along with the determined root cause:

Summary: Query execution timeout issue during data retrieval for the report initiated by ‘DataExpert.’

Initial Root cause: Network failure.

Moreover, the LLM 210 may analyse the root cause and generate the explanation of the root cause as below:

Root Cause:

Network failure in SAP Business Objects affecting various services, including query execution.

Explanation: Based on the input provided, the most probable root cause of the incoming incident is a network issue in the BO system, which is impacting data services. None of the previously occurring incidents are like the incoming incident and hence root cause is identified based on the system logs of the novel incident.

The method 400 may include implementing 410 the resolution on the computer network based on the root cause. Specifically, the resolution module 216 may gather the resolution information associated with the root cause and generate a resolution communication having the incident summary, the root cause, and an explanation associated with the root cause.

Figure 5:
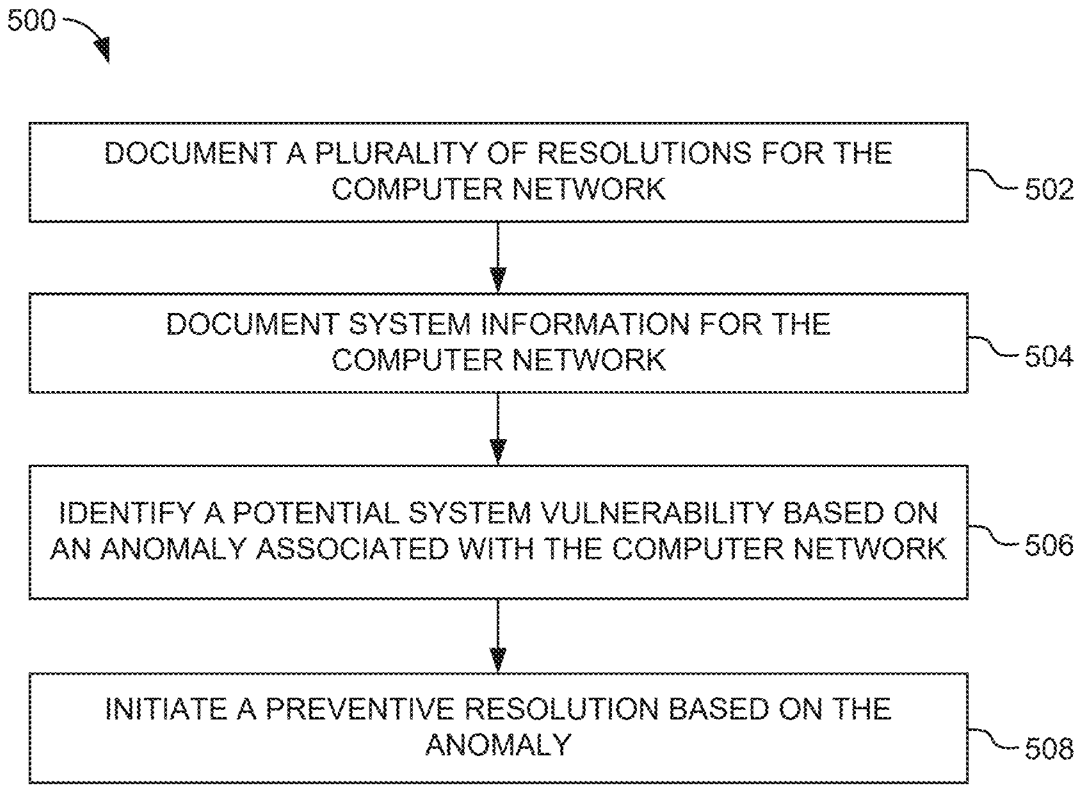
FIG. 5 illustrates a flow diagram of an example method for anomaly detection, in accordance with implementations of the present disclosure.

FIG. 5 illustrates the flow diagram of an example method 500 for anomaly detection, in accordance with implementations of the present disclosure. In some implementations, the method 500 may be described in conjunction with FIG. 2.

The method 500 may include documenting 502 a plurality of resolutions for the computer network, the plurality of resolutions including the resolution. Specifically, the knowledgebase 212 may store the documented resolutions for various network issues, including detailed descriptions of the root causes, symptoms, and remediation steps.

The method 500 may include routing 504 documenting system information associated with proper functioning of the computer network. Specifically, the reference manual repository 220 may store the system information and logs associated with the network's functioning.

The method 500 may include identifying 506 a potential system vulnerability based on an anomaly associated with the computer network. The potential system vulnerability may be identified by comparing system logs associated with the potential system vulnerability with system logs associated with the plurality of resolutions and system logs associated with proper function of the computer network to determine the anomaly. Specifically, the system logs stored in the knowledgebase 212 may be parsed to extract the structured information. Moreover, the extracted information may be transformed into the vectors by the embedding module 222 and stored in the vector store 224. Thereafter the knowledge inference engine 218 may compare the system logs to determine the anomaly. The determined may indicate potential vulnerabilities.

The method 500 may include initiating 508 a preventive resolution based on the anomaly. Specifically, once the anomaly is determined, the resolution module 216 may initiate the preventive resolution. Herein, the preventive resolution may refer to the predetermined set of actions or procedures to address potential issues before they escalate into incidents.

Implementations of the present disclosure provides technical solutions to multiple technical problems that arise in the context of incident analysis. For example, the present disclosure includes implementing the incident resolution protocol. Specifically, by leveraging the commonsense knowledge graph, generated by the context identification module 304, the potential resolutions for the incidents may be identified. This is achieved by applying commonsense reasoning to the incident description, enabling the system 200 to draw analogies and infer potential solutions, even in the absence of direct historical precedents.

Furthermore, if the input incident is novel and lacks relevant historical data, the prompt builder 208 may generate prompt to generate the incident summary based on the system logs. The LLM 210 may process the prompt (using machine learning and natural language processing techniques) and generate a potential root cause for the incident, along with a detailed explanation that supports the conclusion. This approach leverages the LLM's 210 ability to process and understand natural language description of the incident, thereby identifying patterns and correlations within the system log data, even in the absence of historical precedents. Further, in the present disclosure, by employing reasoned prompting by prompt builder 208, the LLM 210 may instruct LLM 210 to analyze complex incidents, even those that are novel or have multiple potential causes, thereby, ensuring that the LLM's 210 responses are accurate, relevant, and actionable.

Furthermore, the present disclosure may implement chain-of-thought prompting to guide the LLM 210 towards a systematic and comprehensive analysis of incidents. By breaking down the incident description into smaller, more manageable steps, the LLM 210 may consider multiple perspectives and arrive at a more accurate root cause identification. This structured approach may enhance the reliability and efficiency of the root cause analysis process.

Figure 6:
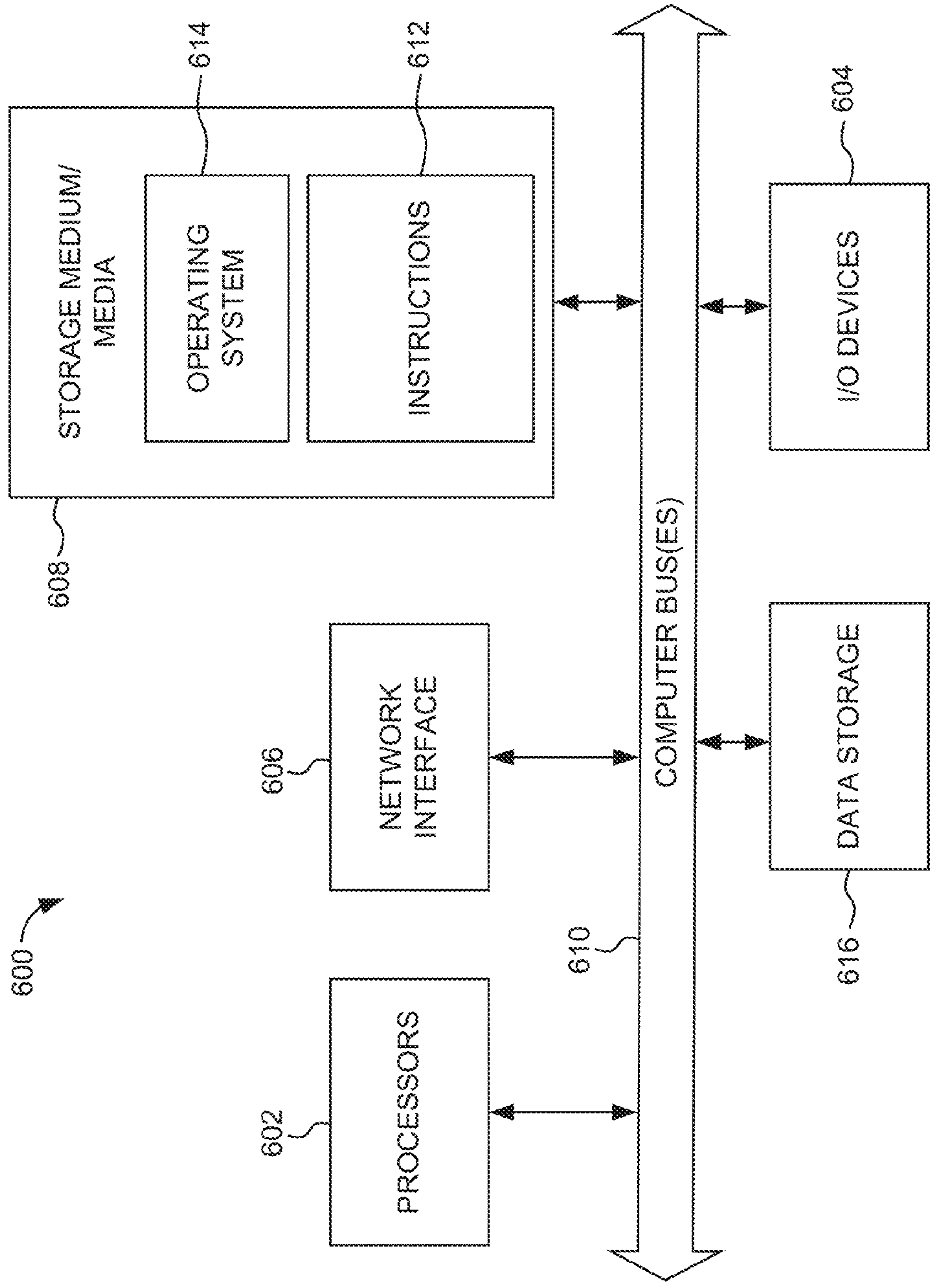
FIG. 6 illustrates an example computer system that may be used to implement the system for product development data analysis, in accordance with implementations of the present disclosure. Occurred techniques Like reference numbers and designations in the various drawings indicate like elements.

Moreover, the present disclosure may implement anomaly detection. By establishing a baseline of normal system behavior, the system 200 continuously monitors system logs (stored in the reference manual repository 220) for deviations. Upon identifying anomalies, the resolution module 216 may promptly initiate resolution protocols to prevent incidents from escalating. Furthermore, the resolution module 216 may include predicting incidents and timely resolving to anticipate potential incidents based on historical data and system logs. By proactively addressing these predicted issues, the system 200 may reduce the occurrence of future incidents FIG. 6 illustrates a computer system 600 that may be used to implement the system for incident analysis. More particularly, computing machines such as desktops, laptops, smartphones, tablets, and wearables which may be used to implement the tasks that may have the structure of the computer system 600. The computer system 600 may include additional components not shown and that some of the process components described may be removed and/or modified. In another example, a computer system 600 may be deployed on external-cloud platforms such as cloud, internal corporate cloud computing clusters, organizational computing resources, and/or the like.

The computer system 600 includes processor(s) 602, such as a central processing unit, ASIC or another type of processing circuit, input/output devices 604, such as a display, mouse keyboard, etc., a network interface 606, such as a Local Area Network (LAN), a wireless 602.11x LAN, a 3G or 4G mobile WAN or a WiMax WAN, and a computer-readable medium 608. Each of these components may be operatively coupled to a bus 610. The computer-readable medium 608 may be any suitable medium that participates in providing instructions to the processor(s) 602 for execution. For example, the computer-readable medium 608 may be non-transitory or non-volatile medium, such as a magnetic disk or solid-state non-volatile memory or volatile medium such as random access memory (RAM). The instructions or modules stored on the computer-readable medium 608 may include machine-readable instructions 612 executed by the processor(s) 602 that cause the processor(s) 602 to perform the methods and functions of the system for incident analysis.

The system may be implemented as software stored on a non-transitory processor-readable medium and executed by the processors 602. For example, the computer-readable medium 608 may store an operating system 614, such as MAC OS, MS WINDOWS, UNIX, or LINUX, and code for the system. The operating system 614 may be multi-user, multiprocessing, multitasking, multithreading, real-time, and the like. For example, during runtime, the operating system 614 is running and the code for the system is executed by the processor(s) 602.

The computer system 600 may include a data storage 616, which may include non-volatile data storage 616. The data storage 616 stores any data used or generated by the system.

The network interface 606 connects the computer system 600 to internal systems for example, via a LAN. Also, the network interface 606 may connect the computer system 600 to the Internet. For example, the computer system 600 may connect to web browsers and other external applications and systems via the network interface 606.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method for implementing an incident resolution protocol for a computer network, comprising:
- identifying incident information relevant to one or more incidents on a computer network, wherein the incident information is gathered over a predetermined run-time period prior to occurrence of the one or more incidents;
- determining a context for the one or more incidents based on the incident information, including generating a chain of event classification for the one or more incidents based on a reasoning-based analysis of an event correlation;
- determining an incident summary for the one or more incidents based on the context via implementation of a large-language model (LLM);
- determining, via further implementation of the LLM, a root cause for the one or more incidents based on the incident summary and the context; and
- implementing a resolution on the computer network based on the root cause, including:
  - gathering resolution information associated with the root cause, including an operational reference document for the computer network;
  - generating a vector embedding for the resolution information, wherein the resolution is recommended based on a probabilistic evaluation of the vector embedding; and
  - generating a resolution communication having the incident summary, the root cause, and an explanation associated with the root cause.

2. The method of claim 1, further comprising:
- documenting a plurality of resolutions for the computer network, the plurality of resolutions including the resolution;
- documenting system information associated with proper functioning of the computer network;
- identifying a potential system vulnerability based on an anomaly associated with the computer network, including comparing system logs associated with the potential system vulnerability with system logs associated with the plurality of resolutions and system logs associated with proper function of the computer network to determine the anomaly; and
- initiating a preventive resolution based on the anomaly.

3. The method of claim 1, wherein the incident information includes at least one of information related to network architecture, information related to one or more network elements, information related to one or more network modules, and network system logs.

4. The method of claim 1, wherein identifying incident information includes:
- identifying one or more system logs relevant to the one or more incidents; and
- mapping one or more relationships between one or more network elements and one or more relationships between one or more network modules.

5. The method of claim 1, wherein determining the context includes:
- establishing the event correlation for the one or more incidents based on the incident information;
- determining one or more category classifications based on a probabilistic evaluation of the chain of event classification; and
- evaluating the one or more category classifications utilizing context-based reasoning to determine the context.

6. The method of claim 1, wherein determining a root cause includes:
- determining one or more affected network elements of the one or more network elements based on the context;
- extracting targeted network information associated with the one or more affected network elements, wherein the targeted network information includes past event information for the one or more affected network elements and network structural information for the one or more affected network elements; and
- associating the targeted network information with one or more potential root causes, wherein the one or more potential root causes include the root cause.

7. The method of claim 6, wherein the targeted network information further includes recent similar incidents and events involving a user associated with the one or more incidents.

8. The method of claim 1, wherein the one or more incidents are similar to a previous incident occurring on the computer network, and the root cause for the one or more incidents is different than a root cause for the previous incident.

9. The method of claim 1, wherein the one or more incidents are not similar to a previous incident on the computer network.

10. A non-transitory, computer-readable medium including machine-readable instructions that are executable by a processor to:
- identify incident information relevant to one or more incidents on a computer network, wherein the incident information is gathered over a predetermined run-time period prior to occurrence of the one or more incidents;

determine a context for the one or more incidents based on the incident information, including generating a chain of event classification for the one or more incidents based on a reasoning-based analysis of an event correlation;

determine an incident summary for the one or more incidents based on the context via implementation of a large-language model (LLM);

determine, via further implementation of the LLM, a root cause for the one or more incidents based on the incident summary and the context;

implement a resolution for the one or more incidents based on the root cause, including gathering resolution information associated with the root cause, including an operational reference document for the computer network, generating a vector embedding for the resolution information, wherein the resolution is recommended based on a probabilistic evaluation of the vector embedding, and generating a resolution communication having the incident summary, the root cause, and an explanation associated with the root cause;

document a plurality of resolutions for the computer network, the plurality of resolutions including the resolution;

document system information associated with proper functioning of the computer network;

identify a potential system vulnerability based on an anomaly associated with the computer network, including comparing system logs associated with the potential system vulnerability with system logs associated with the plurality of resolutions and system logs associated with proper function of the computer network to determine the anomaly; and initiating a preventive resolution based on the anomaly.

11. The non-transitory, computer-readable medium of claim 10, wherein the incident information at least one of information related to network architecture, information related to one or more network elements, information related to one or more network modules, and network system logs.

12. The non-transitory, computer-readable medium of claim 11, including instructions executable by the processor to:

identify one or more system logs relevant to the one or more incidents; and map one or more relationships between the one or more network elements and one or more relationships between the one or more network modules.

13. The non-transitory, computer-readable medium of claim 10, wherein the one or more incidents are similar to a previous incident occurring on the computer network, and the root cause for the one or more network incidents is different than a root cause for the previous incident.

14. The non-transitory, computer-readable medium of claim 10, wherein the one or more incidents are not similar to a previous incident on the computer network.

15. A system comprising:

a processor;

a non-transitory memory device including machine-readable instructions that are executable by the processor to:

identify incident information relevant to one or more incidents on a computer network, wherein the incident information is gathered over a predetermined run-time period prior to occurrence of the one or more incidents;

determine a context for the one or more incidents based on the incident information, including generating a chain off event classification for the one or more incidents based on a reasoning-based analysis of an event correlation;

determine an incident summary for the one or more incidents based on the context via implementation of a large-language model (LLM);

determine, via further implementation of the LLM, a root cause for the one or more incidents based on the incident summary and the context; and implement a resolution on the computer network based on the root cause, including:

gathering resolution information associated with the root cause, including an operational reference document for the computer network;

generate a vector embedding for the resolution information, wherein the resolution is recommended based on a probabilistic evaluation of the vector embedding; and generating a resolution communication having the incident summary, the root cause, and an explanation associated with the root cause.

16. The system of claim 15, wherein the non-transitory memory device further includes machine-readable instructions that are executable by the processor to:

identify one or more system logs relevant to the one or more incidents; and map one or more relationships between one or more network elements and one or more relationships between one or more network modules.

17. The system of claim 16, wherein the non-transitory memory device further includes machine-readable instructions that are executable by the processor to:

establish the event correlation for the one or more incidents based on the incident information;

determine one or more category classifications based on a probabilistic evaluation of the chain of event classification; and evaluate the one or more category classifications via context-based reasoning to determine the context.

18. The system of claim 17, wherein the non-transitory memory device further includes machine-readable instructions that are executable by the processor to:

determine one or more affected network elements of the one or more network elements based on the context;

extract targeted network information associated with the one or more affected network elements, wherein the targeted network information includes information associated with past events associated with the one or more affected network elements and network structural information for the one or more affected network elements; and associate the information associated with past events with one or more potential root causes, wherein the one or more potential root causes include the root cause.

* * * * *